(12) United States Patent
Park et al.

(10) Patent No.: US 6,714,353 B2
(45) Date of Patent: Mar. 30, 2004

(54) OPTICAL DEVICE WITH A FUNCTION OF HOMOGENIZING AND COLOR SEPARATION, AND OPTICAL ILLUMINATION SYSTEM FOR A PROJECTOR USING THE SAME

(75) Inventors: Tae Soo Park, Namyangiu-si (KR); Kee Tee Um, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/215,040

(22) Filed: Aug. 9, 2002

(65) Prior Publication Data

US 2003/0030913 A1 Feb. 13, 2003

(30) Foreign Application Priority Data

Aug. 10, 2001 (KR) .......................................... 2001-48218

(51) Int. Cl.[7] .............................................. G02B 27/12
(52) U.S. Cl. ........................................ 359/640; 359/639
(58) Field of Search ................................. 359/640, 639, 359/625, 618

(56) References Cited

U.S. PATENT DOCUMENTS 6,590,714 B2 * 7/2003 Sugawara ................... 359/634

* cited by examiner

Primary Examiner—Hung X. Dang
(74) Attorney, Agent, or Firm—Birch, Stewart, Kolasch & Birch, LLP (57) ABSTRACT

The optical device with a function of homogenizing and color separation according to the present invention has a shape of rod, makes a distribution of light uniform by totally u reflecting the incidence light at a boundary inside the device repeatedly, and separates the incidence light into light of different colors based on a wavelength band, the light of different colors outputted through different optical paths which are not overlaid one another.

17 Claims, 5 Drawing Sheets

OPTICAL DEVICE WITH A FUNCTION OF HOMOGENIZING AND COLOR SEPARATION, AND OPTICAL ILLUMINATION SYSTEM FOR A PROJECTOR USING THE SAME

BACKGROUND OF THE INVENTION

1. Field of the Invention

The present invention relates generally to an optical illumination system for a projection system, and more particularly to an optical device with a function of homogenizing and color separation and an optical illumination system for a projector whose size can be reduced by use of the optical device.

2. Description of the Prior Art

Recently, as a kind of a flat display, which is thin in its thickness and can realize a large screen, substituted for a cathode ray tube display, which is limited in its screen size and large in its system size, projectors for projecting pictures of a small-sized screen on a large-sized screen with a magnification are coming into rapid and wide use.

The projectors, which are display devices for realizing pictures on small-sized screen, can employ a cathode ray tube, an LCD (Liquid Crystal Display) or a DMD (Digital Micromirror Device), but use mainly the LCD or the DMD according to a trend of down-sizing in thickness.

The LCD realizes pictures by changing an alignment state of liquid crystal molecules depending upon electrical variations from the external, and controlling an amount of light transmission based on the changed alignment state of liquid crystal molecules. The DMD realizes pictures by changing inclination angles of micromirrors between +10° and −10° depending upon electrical variations from the external, such that a reflection angle of light has two modes.

Such projectors are currently developing with the most important point put on high brightness, miniaturization and lightweight.

More particularly, the projectors are being improved to have a vivid screen even under bright surroundings by employing a lamp used as a source of light with a small magnitude of light emission, fly eye lenses for homogenizing an amount of light, polarization conversion devices for converting light emitted from the source of light into linear polarized light, etc., such that an efficiency of light is increased.

In addition, for the miniaturization and lightweight, the projectors are developing from a three-plate system for realizing colors using three display elements to a single-plate system for realizing colors using one display element.

The projectors employing the single-plate system using one display element use a method of color filters for realizing colors, a method of sequentially providing three primary colors for the display element, a method of separating and scrolling three primary colors, etc.

Among these methods, an optical illumination system using three rotating prisms for changing a traveling direction of colored light and scrolling the colored light separated from dichroic mirrors for color separation can be representative of the method of separating and scrolling three-primary colors.

Figure 1:
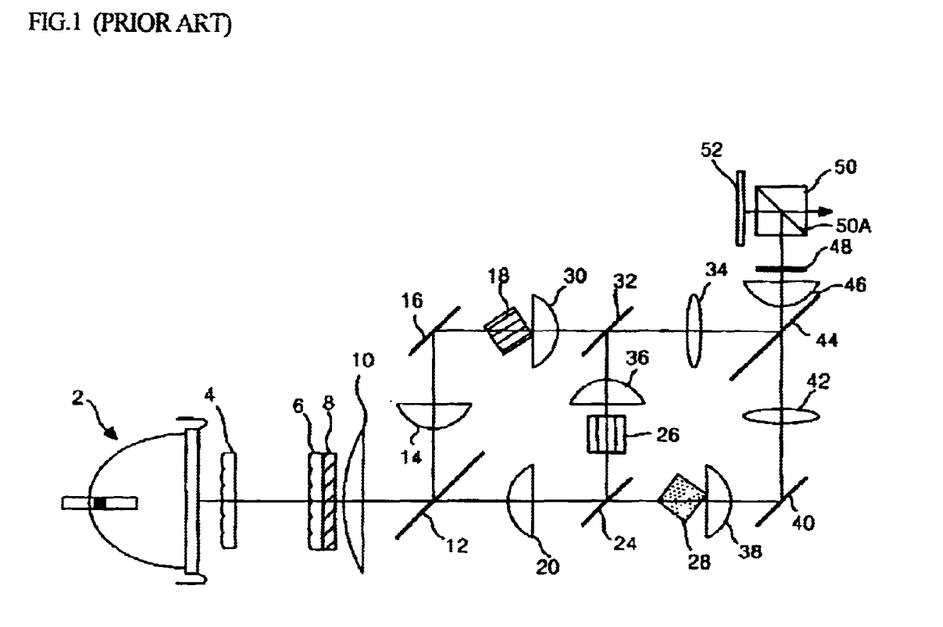
FIG. 1 is a view showing a configuration of an conventional optical illumination system for a projector employing a single-plate system using three rotating prisms.

FIG. 1 is a view showing a structure of a conventional optical illumination system of a projector employing a single-plate system using three rotating prisms.

Referring to FIG. 1, the optical illumination system includes first and second fly eye lenses 4 and 6, a polarizing beam split (referred to as PBS hereinafter) array 8, first to fourth dichroic mirrors 12, 24, 32 and 44 for color separation, first and second total reflection mirrors 16 and 40 for totally reflecting incidence light, first to third rotating prisms 18, 26 and 28 for changing an optical path depending on their rotation angles, first to seventh condensing lenses 10, 14, 30, 36, 38 and 46 for condensing light, first and second relay lenses 34 and 42 for relaying an image formation point, and a PBS prism 50, all of which are arranged on an optical path between a source of light 2 and a display device 52.

Now, an operation of the optical illumination system of the projector as shown in FIG. 1 will be described.

The first and second fly eye lenses 4 and 6 make light distribution uniform by dividing white light from the source of light 2 by the unit of lens cell and outputting the divided light to the PBS array 8.

The PBS array 8 separates the incidence light into linear polarized light having one of optical axes, i.e., P polarized light and S polarized light. Here, the S polarized light is outputted as it is, and the P polarized light is converted and outputted into S polarized light by a ½ wavelength plate (not shown) partially attached on a back side of the PBS array 8, such that a state of polarization becomes uniform. The first condensing lens 10 condenses the light outputted from the PBS array 8 into the first dichroic mirror 12.

The dichroic mirror 12 is made of a blue reflection coating for reflecting blue light, and green and red transmission coatings for transmitting green and red light, respectively. The first total reflection mirror 16 totally reflects blue light, which is reflected by the first dichroic mirror 12 and inputted through the second condensing lens 14, into the first rotating prism 18.

The second dichroic mirror 24 made of a green reflection coating and a red transmission coating reflects green light into the second rotating prism 26 and transmits red light into the third rotating prism 28, both of green and red light being incidence light transmitted by the first dichroic mirror 24 and inputted through the third condensing lens 20.

The first to third rotating prisms 18, 26 and 28 change traveling directions of blue, green and red light depending on their rotation angles, respectively. More particularly, The first to third rotating prisms 18, 26 and 28 change image formation positions of blue, green and red light at which images are formed on the display device 52 depending on their rotation angles, respectively, and scroll the image formation positions of the three color light sequentially, while they are rotating independently.

The blue light transmitted through the first rotation prism 18 is inputted to the fourth dichroic mirror 44 via the fourth condensing lens 30, the third dichroic mirror 32, and the first relay lens 34. The green light transmitted through the second rotation prism 26 is inputted to the fourth dichroic mirror 44 via the fifth condensing lens 36, the third dichroic mirror 32, and the first relay lens 34. The red light transmitted through the third rotation prism 28 is inputted to the fourth dichroic mirror 44 via the sixth condensing lens 38, the second total reflection mirror 40, and the second relay lens 42.

The third dichroic mirror 32 is made of a red reflection coating for totally reflect the red light from the second rotating prism 26 and a blue transmission coating for transmitting the blue light from the first rotating prism 18. The fourth dichroic mirror 44 reflects the incidence blue light and green light and transmits the incidence red light.

Each of the red, green and blue light transmitted or reflected by the first to fourth dichroic mirrors 12, 24, 32 and 44 has a S polarization component and is inputted to the PBS prism 50 via the seventh condensing lens 46 and a polarization plate 48.

The S polarized light inputted from the polarization plate 48 to the PBS prism 50 is reflected at a polarized light split surface 50A into the display device 52. In this case, based on different initially set rotation angles of the first to third rotating prism 18, 26 and 28, the red, green and blue light form images on different portions of the display device 52. The different image formation positions are scrolled in a specific direction when the first to third rotating prism 18, 26 and 28 are driven. The display device 52 scrolls red, green and blue signals in accordance with the red, green and blue light inputted while the different image formation positions are speedily scrolled.

Accordingly, each of the three color signals is implemented in an according pixel of the display device 52 and the implemented three color signals are integrated with time for displaying a color picture. In case that the display device 52 is a reflection-typed liquid crystal display device, the S polarized light inputted from the PBS prism 50 is converted into P polarized light depending on video signals for implementing a color picture. The color picture with the P polarized light component implemented in the display device 52 is projected on a screen with a magnification via the PBS prism 50 and a projection lens (not shown).

However, the projectors employing the single-plate system using the three rotating prisms as described above have a problem that it is difficult to accomplish a synchronization in time among the three rotating prisms.

More particularly, although the synchronization in time among the three rotating prisms is initially accomplished, a difference in the synchronization in time among the three rotating prisms is increasingly generated by a variation among drivers of the rotating prisms as a period of time elapses after the optical illumination system is organized. Thus, when the synchronization in time among the three rotating prisms becomes different, it is impossible to implement a desired color on the screen.

Also, in addition to the three rotating prisms and a plurality of dichroic mirrors for color separation, since the conventional optical illumination system for the projector employing the single-plate system further requires motors for driving the three rotating prisms, it has problems that the optical illumination system becomes complicated in its structure and large in its volume due to a relatively more space occupied by them, resulting in a difficulty of miniaturization and down-sizing in thickness of the system.

SUMMARY OF THE INVENTION

Accordingly, the present invention has been made keeping in mind the above problems occurring in the prior art, and an object of the present invention is to provide an optical device with a function of homogenizing and color separation and an optical illumination system for a projector whose size can be reduced by use of only the optical device and one prism.

The optical illumination system for the projector employing a single-plate system according to the present invention has an advantage in that homogenization of optical distribution and improvement of optical efficiency can be accomplished and the volume of the optical illumination system can be reduced at its maximum, compared to the conventional optical illumination system using the fly eye lenses and the three rotating prisms, by use of only the optical device with the function of homogenizing and color separation and one prism.

In addition, since three colors light is scrolled by use of only one prism, deterioration of picture quality due to a difference in the synchronization in time among the three rotating prisms can be prevented, unlike the conventional optical illumination system using the three rotating prisms.

In the end, the optical illumination system for the projector employing a single-plate system according to the present invention has remarkable advantages in that the miniaturization and lightweight of the projector can be accomplished and picture quality can be improved.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 2:
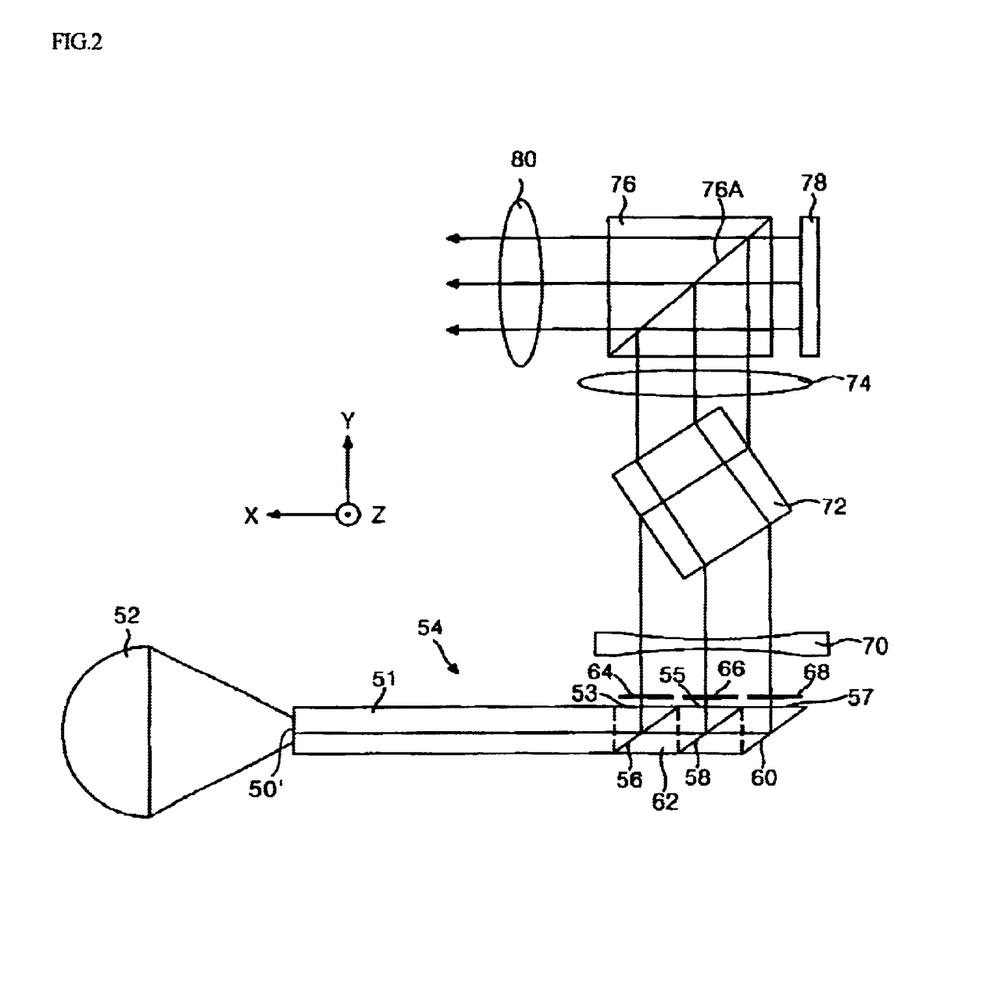
FIG. 2 is a view showing a configuration of an optical illumination system for a projector employing a single-plate system using an optical device with a function of homogenizing and color separation according to an embodiment of the present invention.

FIG. 2 is a view showing a configuration of a conventional optical illumination system for a projector employing a single-plate system using an optical device with a function of homogenizing and color separation according to an embodiment of the present invention.

Referring to FIG. 2, a configuration and an operation of an optical illumination system for a projector using an optical device with a function of homogenizing and color separation according to an embodiment of the present invention will be described below.

The optical illumination system for the projector according to the present invention as shown in FIG. 2 includes an optical device 54 with a function of homogenizing and color separation, an anamorphic optical system 70, a rotating prism 72, and a total internal reflection prism (referred to as TIR hereinafter) 76, which are sequentially arranged on an optical path between the source of light 52 and the display device (48 in FIG. 1), and further includes first and second relay lenses 74 and 80.

In addition, the source of light 52 is composed of a lamp (not shown) for emitting light and a reflection mirror (not shown) for reflecting the light emitted from the lamp into the optical device 54 with the function of homogenizing and color separation.

The light emitted from the lamp is reflected by the reflection mirror and then condensed on an incidence surface 50' of the homogenizing and color separation optical device 54. The homogenizing and color separation optical device 54 makes the distribution of light uniform by totally reflecting, in its internal, the incidence light condensed on the incidence surface 50' repeatedly, and separates the incidence light into the red, green and blue light.

For the purpose of accomplishing this, the homogenizing and color separation optical device 54 is of the form of a comparatively long rod and has first and second dichroic coating surfaces 56 and 58 for separating the three colors light and a total reflection coating surface 60 provided in parallel to the coating surfaces 56 and 58.

The first and second dichroic coating surfaces 56 and 58 and the total reflection coating surface 60 are arranged with an inclination within the homogenizing and color separation optical device 54 such that the light reflected by the surfaces 56, 58 and 60 travels along a direction of a Y axis perpendicular to an X axis being a traveling direction of the incidence light.

In the embodiment of the present invention as shown in FIG. 2, the first and second dichroic coating surfaces 56 and 58 and the total reflection coating surface 60 are provided in the homogenizing and color separation optical device 54 by using a plurality of triangular prisms 62.

More particularly, of five triangular prisms 62 having same medium as a rod lens 51 of rectangular hexahedron shape, the first and second dichroic coating surfaces 56 and 58 are formed on inclined surfaces of two triangular prisms 62 by dichroic coating, and the total reflection coating surface 60 is formed on an inclined surface of one triangular prism 62 by total reflection coating.

Next, two remaining triangular prism 62 are attached on the dichroic-coated inclined surfaces of the triangular prisms such that the first and second dichroic coating surfaces 56 and 58 and the total reflection coating surface 60 are arranged in parallel to each other. Finally, such a combination of the five triangular prisms 62 is integrally attached to the rod lens 51 of rectangular hexahedron shape, so that the homogenizing and color separation optical device 54 is completed.

The homogenizing and color separation optical device 54 consists of a medium having a refractive index (n>1) larger than that of the external, i.e., air, for internal total reflection. When the light inputted to the homogenizing and color separation optical device 54 travels inside the device 54 and then is inputted above a prescribed critical angle to a boundary between the homogenizing and color separation optical device 54 and the air, the light is totally reflected at the boundary. Thus, the light inputted to the homogenizing and color separation optical device 54 is inputted to the first dichroic coating surface 56 after totally reflected inside the device repeatedly.

The first dichroic coating surface 56 reflects light having a desired wavelength band, for example, blue light, to be outputted to the external through a first output surface 53 and transmits the remaining red and green light to the second dichroic coating surface 58. The second dichroic coating surface 58 reflects light having a desired wavelength band, for example, the red light, of the red and green light transmitted through the first dichroic coating surface 56, to be outputted to the external through a second output surface 55 adjacent to the first output surface 53 and transmits the remaining green light to the total reflection coating surface 60. The total reflection coating surface 60 outputs the green light transmitted through the second dichroic coating surface 58 to the external through a third output surface 57 adjacent to the second output surface.

Thus, the blue, red and green light is in parallel outputted with an uniform distribution of light through the first to third output surfaces 53, 55 and 57, which are not overlapped one another, of the homogenizing and color separation optical device 54.

First to third color filters 64, 66 and 68 for enhancing color purity are further provided on their respective paths of the three colors light corresponding to the first to third output surfaces 53, 55 and 57, each filter being apart from a corresponding one of the output surfaces by a specific distance. When the blue, red and green light is outputted from the first to third output surfaces 53, 55 and 57, blue, red and green color filters are respectively provided corresponding to the output surfaces in order to enhance the color purity.

For the purpose of improving an optical efficiency of the three colors light outputted from the first to third output surfaces 53, 55 and 57 of the homogenizing and color separation optical device 54, a display device 78 and each of the first to third output surfaces 53, 55 and 57 are set to have same aspect ratio. However, since the blue, red and green light separated in the homogenizing and color separation optical device 54 travels in parallel to the Y axis, an optical width in the direction of the Y axis is relatively increasing.

For preventing this increase of the optical width, the anamorphic optical system 70 for reducing the optical width in the direction of the Y axis by ⅓ is provided, by which an aspect ratio of the optical path (a ratio of an optical width in the direction of the Y axis to that of a Z axis) along which the red, green and blue light travel becomes equal to an aspect ratio of the display device 78. Such an anamorphic optical system 70 consists of a cylindrical lens and the like.

The rotating prism 72 refracts the three colors light inputted to respective positions on the rotating prism 72 without any overlay via the anamorphic optical system 70 such that the three colors light is outputted in parallel along different optical paths, and scrolls the outputted three colors light in a specific direction by rotating by a driving motor (not shown).

The TIR prism 76 made from high polymer material totally reflects the three colors light inputted from the rotating prism 74 at a TIR surface 76A into the display device 78 for picture implementation and transmits the picture implemented in the display device 78 to a projecting lens (not shown).

The display device 78 implements the picture using the three colors light reflected by the TIR prism 76.

Figure 3:
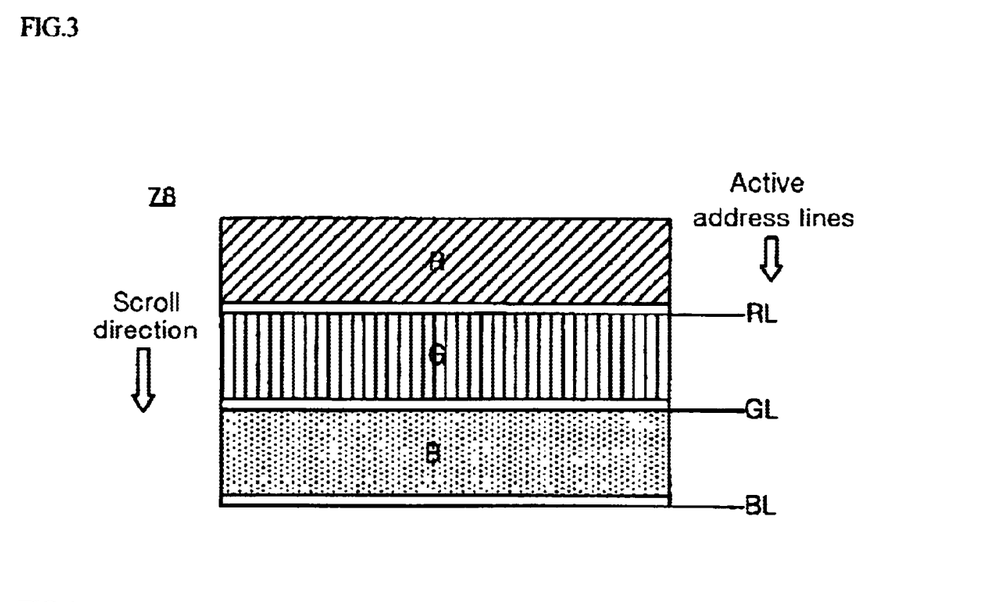
FIGS. 3 and 4 are views for explaining methods for scrolling colors in a display device according to the present invention.
Figure 4:
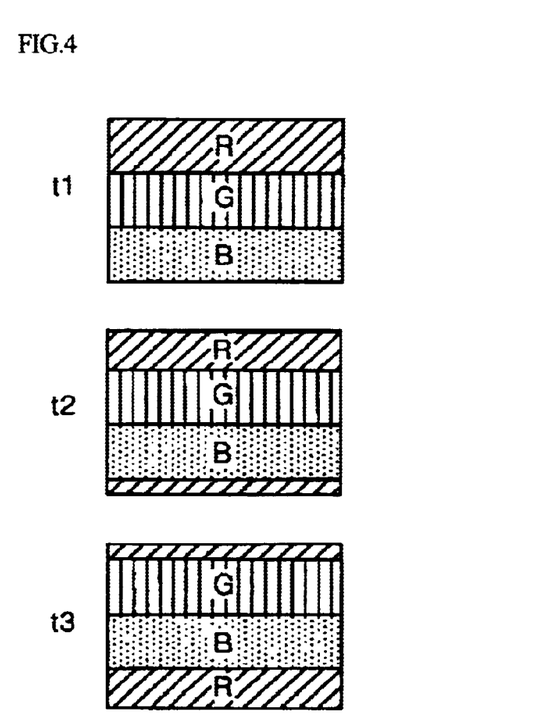

FIGS. 3 and 4 are views for explaining methods for scrolling colors in the display device 78 according to the present invention, where the three colors light inputted in parallel along the different optical paths via the rotating prism 72 forms images in color stripe regions R, G and B of the display device 78 as shown in FIG. 3.

Simultaneously, as the rotating prism 72 is rotated, the color stripe regions R, G and B are scrolled with a lapse of time from t1 to t3, as shown in FIG. 4.

Also, in accordance with the red, green and blue light inputted while the color stripe regions R, G and B are scrolled, address lines RL, GL and BL for displaying red, green and blue light signals on the display device 78 are scrolled. Accordingly, the three colors light is sequentially implemented in each of pixels of the display device 78 and the implemented three colors light is integrated with time for the display of color picture.

In case that the display device 78 is a DMD device, the picture is implemented by controlling an amount of reflection of the incidence light from the TIR prism 76 depending on a magnitude of electrical signal by using micromirrors.

The color picture implemented in the display device 78 is projected with a magnification on the screen via the TIR prism 76, and the projecting lens (not shown) and the first and second relay lenses 74 and 80 play a role of relaying image formation points of the traveling light without any loss.

The optical illumination system according to the embodiment of the present invention as constructed above can be reduced at maximum in its size by using the homogenizing and color separation optical device 54 and one rotating prism 72.

Particularly, the size of the optical illumination system can be further reduced when optical parts are arranged such that an optical path from the source of light 52 to the projecting lens (not shown) has a "C" shape.

Figure 5:
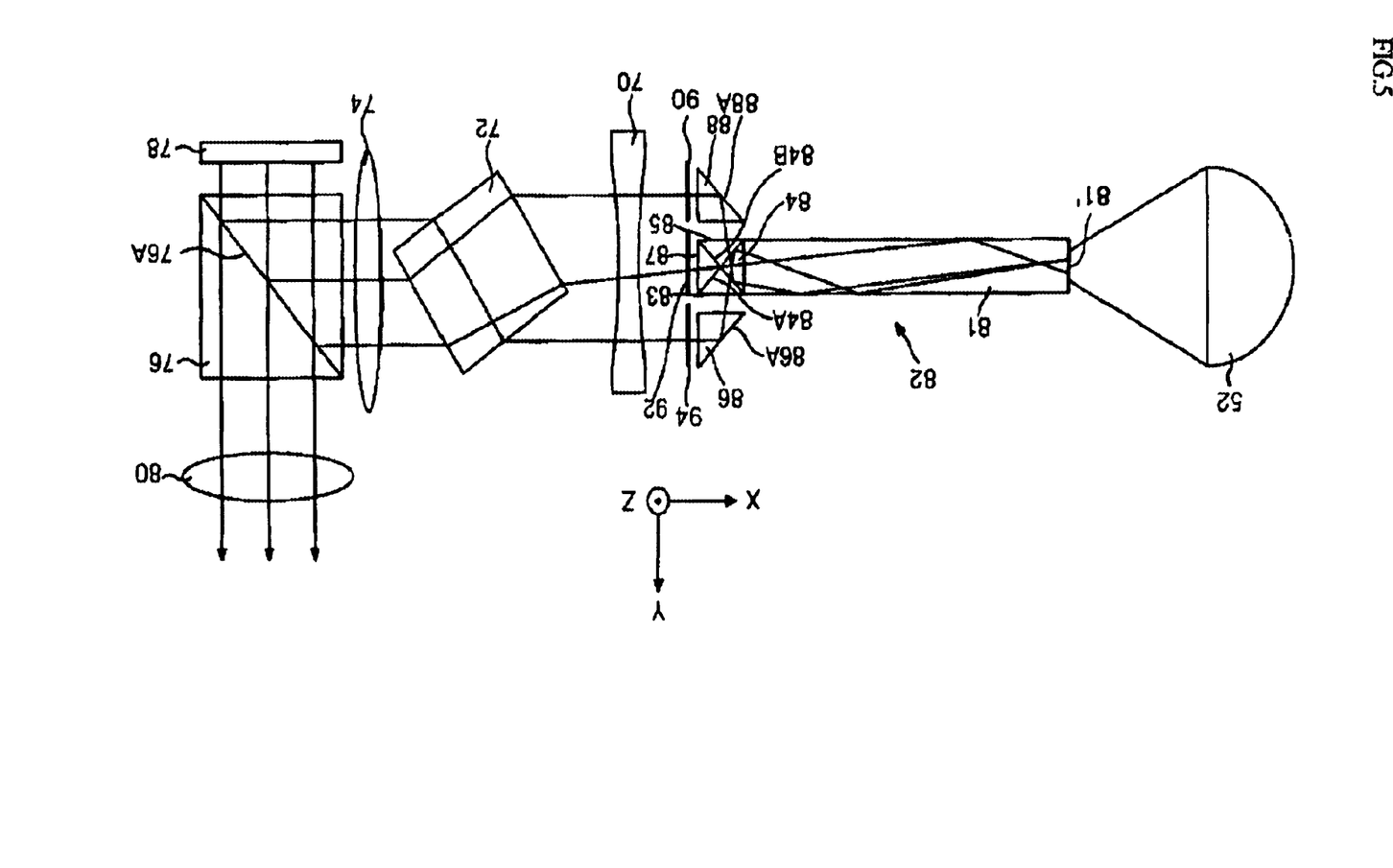
FIG. 5 is a view showing a configuration of an optical illumination system for a projector employing a single-plate system using an optical device with a function of homogenizing and color separation according to another embodiment of the present invention.

FIG. 5 is a view showing a configuration of an optical illumination system for a projector employing a single-plate system using an optical device with a function of homogenizing and color separation according to another embodiment of the present invention.

The optical illumination system as shown in FIG. 5 has same elements as in FIG. 2 except that a homogenizing and color separation optical device 82 of FIG. 5 is different in structure from that of FIG. 2, optical path change devices 86 and 88 are additionally provided in FIG. 5, and an entire arrangement of the optical parts in FIG. 5 is different from that in FIG. 2. Therefore, the detailed description for the same elements will be omitted for the purpose of simplification.

In the optical illumination system as shown in FIG. 5, the source of light 52 consisting of a lamp (not shown) and a reflection mirror (not shown) condenses the light emitted from the lamp on an incidence surface 81' of the homogenizing and color separation optical device 82. The homogenizing and color separation optical device 82 makes the distribution of light uniform by totally reflecting, in its internal, the incidence light condensed on the incidence surface 81' repeatedly, and separates the incidence light into the red, green and blue light.

For the purpose of accomplishing this, the homogenizing and color separation optical device 82 is of the form of a comparatively long rod and has first and second dichroic coating surfaces 84A and 84B intersecting each other for separating the three colors light. The first and second dichroic coating surfaces 84A and 84B are respectively arranged such that the light reflected by the surfaces 84A and 84B travels along a +Y axis and a −Y axis, respectively, each axis perpendicular to an X axis being a traveling direction of the incidence light, and the light transmitted through the surfaces 84A and 84B travels along the X axis.

In the optical illumination system as shown in FIG. 5, the first and second dichroic coating surfaces 84A and 84B are provided in the homogenizing and color separation optical device 82 by using a regular hexahedron prism 84 formed by four triangular prisms attached together.

More particularly, of the four triangular prisms having same medium as rod lens 81 of rectangular hexahedron shape, a first dichroic coating is applied on one surface of each of two triangular prisms and a second dichroic coating is applied on one surface of each of the remaining two triangular prisms. Next, the four triangular prisms are attached together such that the first and second dichroic coating surfaces 84A and 84B intersect each other. Finally, such a combination of the four triangular prisms is integrally attached to the rod lens 81 of rectangular hexahedron shape, so that the homogenizing and color separation optical device 82 is completed.

The homogenizing and color separation optical device 82 consists of a medium having a refractive index (n>1) larger than that of the external, i.e., air, for internal total reflection. When the light inputted to the homogenizing and color separation optical device 82 travels inside the device 54 and then is inputted above a prescribed critical angle to a boundary between the homogenizing and color separation optical device 82 and the air, the light is totally reflected at the boundary. Thus, the light inputted to the homogenizing and color separation optical device 82 is inputted to the first and second dichroic coating surfaces 84A and 84B after totally reflected inside the device repeatedly.

The first dichroic coating surface 84A reflects light having a desired wavelength band, for example, blue light, to be outputted to the external through a first output surface 83. The second dichroic coating surface 84B reflects light having a desired wavelength band, for example, the red light, to be outputted to the external through a second output surface 85 opposite to the first output surface 83. The green light transmitted through the first and second dichroic coating surfaces 84A and 84B is outputted to the external through a third output surface 87 opposite to the incidence surface.

In other words, the first to third output surfaces 83, 85 and 87 of the homogenizing and color separation optical device 82 are arranged into a "C" shape such that the blue, red and green light is outputted with a uniform distribution of light in three different directions (+Y axis, −Y axis and X axis directions) without any overlay.

Each of first and second optical path change devices 86 and 88 changes traveling paths of the blue light from the first output surface 83 and the red light from the second output surface 85 such that the blue, red and green light having traveled in the three different directions (+Y axis, −Y axis and X axis directions) is in parallel traveled. For accomplishing this, the first and second optical path change devices 86 and 88 of a triangular prism shape have total reflection coating surfaces 86A and 88A on their inclined surfaces, respectively.

The first optical path change device 86 provided with a prescribed air gap between the device 86 and the first output surface 83 of the homogenizing and color separation optical device 82 reflects at a right angle the blue light outputted from the first output surface 83 at a total reflection coating surface 86A such that the blue light travels in parallel to the green light outputted from the third output surface 87.

The second optical path change device 88 provided with a prescribed air gap between the device 88 and the second output surface 85 of the homogenizing and color separation optical device 82 reflects at a right angle the red light outputted from the second output surface 85 at a total reflection coating surface 88A such that the red light travels in parallel to the green light outputted from the third output surface 87.

The blue, red and green light outputted from the first and second optical path change devices 86 and 88 and the homogenizing and color separation optical device 82 has a uniform distribution of light. In addition, first to third color filters 90, 92 and 94 are further provided on the traveling paths of the three colors light for enhancing color purity.

Other elements than the above-described elements in the optical illumination system of FIG. 5 are equal in structure and operation to those of FIG. 2 described earlier.

In other words, the anamorphic optical system 70, the rotating prism 72, the TIR prism 76, the display device 78, and the first and second relay lenses 74 and 80 are equal in structure and operation to those of FIG. 2.

The optical illumination system according to another embodiment of the present invention as constructed above can be also reduced at maximum in its size by using the homogenizing and color separation optical device 82 and one rotating prism 72.

Particularly, the optical parts are arranged such that an optical path from the source of light 52 to the projecting lens (not shown) has an "L" shape unlike FIG. 2.

Figure 6:
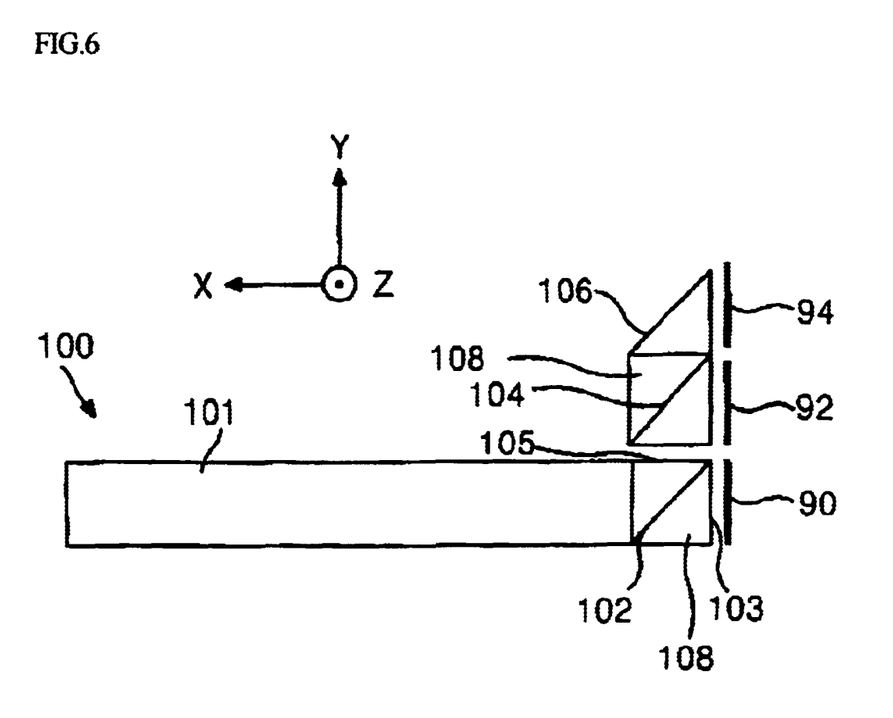
FIG. 6 is a view showing a detailed configuration of the optical device with a function of homogenizing and color separation in an optical illumination system for a projector employing a single-plate system according to still another embodiment of the present invention.

FIG. 6 is a view showing a detailed configuration of a homogenizing and color separation optical device in an optical illumination system according to still another embodiment of the present invention, which is also applicable to an arrangement of the optical path of the "L" shape as shown in FIG. 5.

The homogenizing and color separation optical device 100 as shown in FIG. 6 makes the distribution of light uniform by totally reflecting, in its internal, the incidence light condensed by the reflection mirror within the source of light (52 in FIGS. 2 and 5) repeatedly, and separates the incidence light into the red, green and blue light.

For the purpose of accomplishing this, the homogenizing and color separation optical device 100 is of the form of a comparatively long rod and has a first dichroic coating surface 102 inside the device 100 for color separation. Outside the homogenizing and color separation optical device 100, a second dichroic coating surface 104 for color separation and a total reflection coating surface 106 for optical path conversion are arranged in parallel to the first dichroic coating surface 102.

The first dichroic coating surface 102 is arranged with an inclination such that the light reflected by the surface 102 travels along the Y axis perpendicular to the X axis being the traveling direction of the incidence light.

More particularly, of two triangular prisms 108 having same medium as a rod lens 101 of rectangular hexahedron shape, as shown in FIG. 6, the first dichroic coating surface 102 is formed by dichroic coating on an inclined surface of one triangular prism. Next, the other triangular prism is attached to the inclined surface of one triangular prism. Finally, such a combination of the two triangular prisms is integrally attached to the rod lens 101 of rectangular hexahedron shape, so that the homogenizing and color separation optical device 100 is completed.

The homogenizing and color separation optical device 100 consists of a medium having a refractive index (n>1) larger than that of the external, i.e., air, for internal total reflection. When the light inputted to the homogenizing and color separation optical device 100 travels inside the device 100 and then is inputted above a prescribed critical angle to a boundary between the optical device 100 and the air, the light is totally reflected at the boundary.

Thus, the light inputted to the homogenizing and color separation optical device 100 is inputted to the first dichroic coating surface 102 after totally reflected inside the device repeatedly.

The first dichroic coating surface 102 transmits light having a desired wavelength band, for example, green light, to be outputted to the external through a first output surface 103 opposite to the incidence surface, and reflects the remaining blue and red light to be outputted to the external through a second output surface 105 perpendicular to the incidence surface.

The second dichroic coating surface 104 and the total reflection coating surface 106 are in parallel arranged by using three triangular prisms 108. Of the three triangular prisms 108, the second dichroic coating surface 104 and the total reflection coating surface 106 are respectively formed on each of inclined surfaces of two triangular prisms. Next, the coating surfaces 104 and 106 are attached to the triangular prisms 108 such that they are in parallel arranged.

In addition, a prism complex in which the second dichroic coating surface 104 and the total reflection coating surface 106 are formed is arranged with a prescribed air gap between the prism complex and the second output surface 105 of the homogenizing and color separation optical device 100.

The second dichroic coating surface 104 reflects light having a desired wavelength band, for example, red light of the incidence light from the second output surface 105, such that the red light travels in parallel to the green light outputted from the first output surface 103.

The total reflection coating surface 106 reflects at a right angle the blue light transmitted through the second dichroic coating surface 104 such that the blue light travels in parallel to the red light.

The first to third color filters 90, 92 and 94 for enhancing color purity are further provided on the traveling paths of the three colors light which travels in parallel with the uniform distribution of light and the color separation achieved by the homogenizing and color separation optical device 100, the second dichroic coating surface 104 and the total reflection coating surface 106.

By using the homogenizing and color separation optical device 100 having the structure as described above, the optical illumination system can accomplish the reduction of size in addition to the homogenized distribution of light and the improvement of optical efficiency.

In addition, when a square PBS prism is used instead of the TIR prism, a reflection-typed LCD panel can be used as the display device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, it should be understood that this invention should not be limited to the detailed description, but should be limited only by the scope and spirit of the appended claims.

What is claimed is:

1. An optical device with a function of homogenizing and color separation, comprising:

a rod lens; and a prism complex attached to said rod lens and including a plurality of triangular prisms having same medium as said rod lens, wherein said prism complex has at least one dichroic coating surfaces and a total reflection coating surface.

2. The optical device according to claim 1, wherein said rod lens consists of a medium having a refractive index larger than that of the external for internal total reflection.

3. The optical device according to claim 1, wherein said at least one dichroic coating surfaces reflect only light having a specific wavelength band of incidence light and said total reflection coating surface reflects light having a wavelength band transmitted through said at least one dichroic coating surfaces.

4. The optical device according to claim 1, wherein said at least one dichroic coating surfaces and said total reflection coating surface are formed on inclined surfaces of said plurality of triangular prisms by dichroic coating and total reflection coating, respectively.

5. The optical device according to claim 1, wherein said at least one dichroic coating surfaces are one or two.

6. The optical device according to claim 1, wherein, when only light having a specific wavelength band of incidence light is reflected by said at least one dichroic coating surfaces to be outputted to the external, another dichroic coating surface for reflecting light having a wavelength band different from the specific wavelength band of the incidence light is further provided on an output surface with a specific air gap.

7. An optical device with a function of homogenizing and color separation, wherein the device has a shape of rod, makes a distribution of light uniform by totally reflecting the incidence light at a boundary inside the device repeatedly, and separates the incidence light into light of different colors based on a wavelength band, the light of different colors outputted through different optical paths which are not overlaid one another.

8. In a projector for projecting with a magnification a picture implemented on a small display device using a projecting lens, an optical illumination system for providing light required for the display device, comprising:
   a source of light for emitting light;
   an optical device with a function of homogenizing and color separation, comprising a rod lens and a prism complex attached to said rod lens and including a plurality of triangular prisms having same medium as said rod lens, wherein said prism complex has at least one dichroic coating surfaces and a total reflection coating surface;
   an anamorphic optical system for reducing an aspect ratio of an optical path of three colors light outputted in parallel from said optical device with the function of homogenizing and color separation to be equal to an aspect ratio of said small display device; and
   a rotating prism for refracting the three colors light from said anamorphic optical system into different parallel optical paths and scrolling the optical paths of the three colors light to be focused on said display device.

9. The optical illumination system according to claim 8, wherein said optical device with the function of homogenizing and color separation has first and second dichroic coating surfaces and a total reflection coating surface therein, all of which are inclined and in parallel to one another, said first and second dichroic coating surfaces reflecting only light having a specific wavelength band of the incidence light and said total reflection coating surface reflecting light having a wavelength band transmitted through said first and second dichroic coating surfaces.

10. The optical illumination system according to claim 9, wherein optical parts on an optical path from said source of light to said projecting lens are arranged such that the optical path assumes a "C" shape.

11. The optical illumination system according to claim 8, wherein said optical device with the function of homogenizing and color separation has first and second dichroic coating surfaces therein, which are inclined and intersect each other, said first and second dichroic coating surfaces reflecting only light having a specific wavelength band of the incidence light, and additionally has first and second optical path conversion means for converting traveling paths of light reflected by said first and second dichroic coating surfaces such that the reflected light travels in parallel to light transmitted through said first and second dichroic coating surfaces without any overlay.

12. The optical illumination system according to claim 11, wherein optical parts on an optical path from said source of light to said projecting lens are arranged such that the optical path assumes a "L" shape.

13. The optical illumination system according to claim 8, wherein said optical device with the function of homogenizing and color separation has a first inclined dichroic coating surface therein, said first inclined dichroic coating surface reflecting only light having a specific wavelength band of the incidence light, and additionally has a second dichroic coating surface for reflecting light having a wavelength band different from the specific wavelength band, a prescribed air gap provided between said second dichroic coating surface and an output surface, and a total reflection coating surface for reflecting light having a wavelength band different from the wavelength band of light reflected by said second dichroic coating surface.

14. The optical illumination system according to claim 13, wherein optical parts on an optical path from said source of light to said projecting lens are arranged such that the optical path assumes a "L" shape.

15. The optical illumination system according to claim 8, further comprising a plurality of color filters for enhancing color purity, which are formed on the traveling paths of the three colors light outputted from said optical device with the function of homogenizing and color separation for enhancing color purity.

16. The optical illumination system according to claim 8, further comprising an internal total reflection prism for internally and totally reflecting the incidence light from said rotating prism into said display device and transmitting a picture implemented on said display device,
   wherein said display device is a digital micromirror display device.

17. The optical illumination system according to claim 8, further comprising a square prism for directing the incidence light from said rotating prism into said display device,
   wherein said display device is a reflection-typed liquid crystal display device.

* * * * *